United States Patent
Lu et al.

(10) Patent No.: US 9,099,719 B2
(45) Date of Patent: Aug. 4, 2015

(54) HEXACYANOFERRATE BATTERY ELECTRODE MODIFIED WITH FERROCYANIDES OR FERRICYANIDES

(71) Applicant: Sharp Laboratories of America, Inc., Camas, WA (US)

(72) Inventors: Yuhao Lu, Vancouver, WA (US); Jong-Jan Lee, Camas, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 334 days.

(21) Appl. No.: 13/897,492

(22) Filed: May 20, 2013

(65) Prior Publication Data

US 2013/0266860 A1    Oct. 10, 2013

Related U.S. Application Data

(63) Continuation-in-part of application No. 13/872,673, filed on Apr. 29, 2013, which is a continuation-in-part of application No. 13/752,930, filed on Jan. 29, 2013, which is a continuation-in-part of application No.

(Continued)

(51) Int. Cl.
*H01M 4/58* (2010.01)
*H01M 4/136* (2010.01)
(Continued)

(52) U.S. Cl.
CPC ............ *H01M 4/136* (2013.01); *H01M 4/0402* (2013.01); *H01M 4/0459* (2013.01);
(Continued)

(58) Field of Classification Search
CPC ..... H01M 4/136; H01M 4/58; H01M 10/054; H01M 4/133; H01M 4/134; H01M 4/04; H01M 4/381; Y02E 60/122; Y02E 60/50; C01B 31/00; C01B 31/04; C01B 31/30; C01D 1/02
USPC .............. 429/211, 231.95, 231.6; 252/519.14
See application file for complete search history.

(56) References Cited

U.S. PATENT DOCUMENTS

| 5,472,807 A | 12/1995 | Licht et al. |
| 2012/0295169 A1 | 11/2012 | Hosoe et al. |
| 2012/0328936 A1 | 12/2012 | Wessells et al. |

FOREIGN PATENT DOCUMENTS

| JP | 2011-180469 | 9/2011 |
| JP | 2011-246303 | 12/2011 |

OTHER PUBLICATIONS

V.D. Neff, Some performance characteristics of a Prussian Blue battery, Journal of Electrochemical Society, 132 (1985) 1382-1384.
(Continued)

*Primary Examiner* — Cynthia H Kelly
*Assistant Examiner* — Monique Wills
(74) *Attorney, Agent, or Firm* — Law Office of Gerald Maliszewski; Gerald Maliszewski

(57) ABSTRACT

A transition metal hexacyanoferrate (TMHCF) battery electrode is provided with a $Fe(CN)_6$ additive. The electrode is made from $A_xM_yFe_z(CN)_n \cdot mH_2O$ particles overlying a current collector, where the A cations are either alkali and alkaline-earth cations such as sodium (Na), potassium (K), calcium (Ca), or magnesium (Mg), and M is a transition metal. A $Fe(CN)_6$ additive modifies the $A_xM_yFe_z(CN)_n \cdot mH_2O$ particles. The $Fe(CN)_6$ additive may be ferrocyanide ($[Fe(CN)_6]^{4-}$) or ferricyanide ($[Fe(CN)_6]^{3-}$). Also provided are a related TMHCF battery with $Fe(CN)_6$ additive, TMHCF fabrication process, and TMHCF battery fabrication process.

17 Claims, 5 Drawing Sheets

Related U.S. Application Data

13/603,322, filed on Sep. 4, 2012, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012.

(51) Int. Cl.
| | | |
|---|---|---|
| *H01M 4/64* | (2006.01) | |
| *H01M 4/62* | (2006.01) | |
| *H01M 4/04* | (2006.01) | |
| *H01M 4/1397* | (2010.01) | |
| *H01M 10/054* | (2010.01) | |
| *H01M 10/0567* | (2010.01) | |

(52) U.S. Cl.
CPC .............. *H01M4/1397* (2013.01); *H01M 4/58* (2013.01); *H01M 4/626* (2013.01); *H01M 4/64* (2013.01); *H01M 10/054* (2013.01); *H01M 10/0567* (2013.01); *Y02E 60/122* (2013.01); *Y10T 29/49115* (2015.01)

(56) References Cited

OTHER PUBLICATIONS

N. Imanishi, et al., Lithium intercalation behavior into iron cyanide complex as positive electrode of lithium secondary battery, Journal of Power Sources, 79 (1999) 215-219.

Y. Lu, L. Wang, J. Cheng, J.B. Goodenough, Prussian blue: a new framwork for sodium batteries, Chemistry Communication, 48(2012)6544-6546.

L. Wang, Y. Lu, J. Liu, M. Xu, J. Cheng, D. Zhang, J.B. Goodenough, A superior low-cost cathode for a Na-ion battery, Angew. Chem. Int. Ed., 52(2013)1964-1967.

A. Eftekhari, Potassium secondary cell based on Prussian blue cathode, J.Power Sources, 126 (2004) 221-228.

C.D. Wessells, R.A. Huggins, Y. Cui, Copper hexacyanoferrate battery electrodes with long cycle life and high power, Nature Communication, 2(2011) 550.

C.D. Wessells et al., Nickel hexacyanoferrate nanoparticle electrodes for aqueous sodium and potassium ion batteries. Nano Lettetter, 11(2011) 5421-5425.

C.D. Wessells et al., The effect of insertion species on nanostructured open framework hexacyanoferrate battery electrode, J. Electrochem. Soc., 159(2012) A98-A103.

T.Matsuda, M. Takachi, Y. Moritomo, A sodium manganese ferrocyanide thin film for Na-ion batteries, Chemical Communications, DOI: 10.1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

T. Matsuda, Y. Moritomo, Thin film electrode of Prussian blue analogue for Li-ion battery, Applied Physics Express, 4(2011)047101.

J. Qian et al., Nanosized Na4Fe(CN)6/C composite as a low-cost and high-rate cathode material for sodium-ion batteries, Advanced Energy Materials, 2(2012)410-414.

CARBON    NITROGEN

TMHCF ELECTRODE 200

204 $A_xM_yFe_z(CN)_n \cdot mH_2O$ PARTICLES

202 CURRENT COLLECTOR

CARBON BLACK ELECTRONIC CONDUCTOR 208

$Fe(CN)_6$ ADDITIVE 206

204 $A_xM_yFe_z(CN)_n \cdot mH_2O$ PARTICLES

HEXACYANOFERRATE BATTERY ELECTRODE MODIFIED WITH FERROCYANIDES OR FERRICYANIDES

RELATED APPLICATIONS

This application is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012, All these applications are incorporated herein by reference.

BACKGROUND OF THE INVENTION

1. Field of the Invention

This invention generally relates to electrochemical cells and, more particularly, to a transition-metal hexacyanoferrate (TMHCF) battery electrode with $Fe(CN)_6$ additives, and associated fabrication processes.

2. Description of the Related Art

A battery is an electrochemical cell through which chemical energy and electric energy can be converted back and forth. The energy density of a battery is determined by its voltage and charge capacity. Lithium has the most negative potential of $-3.04$ V vs. $H_2/H^+$, and has the highest gravimetric capacity of 3860 milliamp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) are exchanged between the positive and negative electrodes. Li-ion batteries have been referred to as rocking chair batteries because the lithium ions "rock" back and forth between the positive and negative electrodes as the cells are charged and discharged. The positive electrode (cathode) material is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector. In the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a Li+-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

FIG. 1 is a diagram depicting the crystal structure of a transition metal hexacyanoferrate (TMHCF) in the form of $A_xM1M2(CN)_6$ (prior art). TMHCF with large interstitial spaces has been investigated as a cathode material for rechargeable lithium-ion batteries [1,2], sodium-ion batteries [3,4], and potassium-ion batteries [5]. With an aqueous electrolyte containing the proper alkali-ions or ammonium-ions, copper and nickel hexacyanoferrates ((Cu,Ni)—HCFs) exhibited a very good cycling life with 83% capacity retained after 40,000 cycles at a charge/discharge rate of 17 C [6-8]. However, the materials demonstrated low capacities and energy densities because: (1) just one sodium-ion can be inserted/extracted into/from each Cu—HCF or Ni—HCF molecule, and (2) these TMHCF electrodes must be operated below 1.23 V due to the water electrochemical window. To correct these shortcomings, manganese hexacyanoferrate (Mn—HCF) and iron hexacyanoferrate (Fe—HCF) have been used as cathode materials in non-aqueous electrolyte [9, 10]. Assembled with a sodium-metal anode, the Mn—HCF and Fe—HCF electrodes cycled between 2.0 V and 4.2 V and delivered capacity of about 110 mAh/g.

Although TMHCF has demonstrated high capacity and energy density with a non-aqueous electrolyte, its cycling life is short, especially for a paste-type Mn—HCF electrode [11]. In general, TMHCF can be expressed as $A_xM_yFe_z(CN)_n \cdot mH_2O$, in which A is alkali-ion or alkaline-ion, and M indicates one or several transition metals. Due to large interstitial spaces, it is inevitable that water molecules exist in the TMHCF formulation. When TMHCF is used in rechargeable batteries, the following reaction occurs in the charge process:

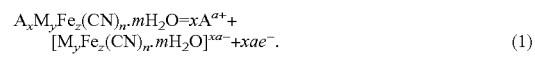

$M_yFe_z(CN)_n \cdot mH_2O$ constitutes the TMHCF framework into/from which "A" can be easily inserted/extracted. The stability of the framework determines the TMHCF cycling life.

In the electrolyte, solid state TMHCF has the following dynamic equilibrium with a liquid electrolyte:

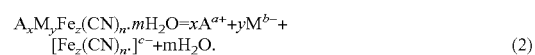

In terms of the above equation (2), it can be known that TMHCF has a tendency to dissolve into the electrolyte, which changes the surface structures of TMHCF. When alkali-ions or alkaline-ions are extracted from TMHCF, the dissolution of TMHCF can be aggravated and the cycling life shortened.

[1] V. D. Neff, Some performance characteristics of a Prussian Blue battery, Journal of Electrochemical Society, 132 (1985) 1382-1384.
[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.
[3] Y. Lu, L. Wang, J. Cheng, J. B. Goodenough, Prussian blue: a new framework for sodium batteries, Chemistry Communication, 48 (2012)6544-6546.
[4] L. Wang, Y. Lu, J. Liu, M. Xu, J. Cheng, D. Zhang, J. B. Goodenough, A superior low-cost cathode for a Na-ion battery, Angew. Chem. Int. Ed., 52 (2013)1964-1967.
[5] A. Eftekhari, Potassium secondary cell based on Prussian blue cathode, J. Power Sources, 126 (2004) 221-228.
[6] C. D. Wessells, R. A. Huggins, Y. Cui, Copper hexacyanoferrate battery electrodes with long cycle life and high power, Nature Communication, 2 (2011) 550.
[7] C. D. Wessells, S. V. Peddada, R. A. Huggins, Y. Cui, Nickel hexacyanoferrate nanoparticle electrodes for aqueous sodium and potassium ion batteries. Nano Letters, 11 (2011) 5421-5425.
[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.
[9] T. Matsuda, M. Takachi, Y. Moritomo, A sodium manganese ferrocyanide thin film for Na-ion batteries, Chemical Communications, DOI: 10.1039/C3CC38839E.
[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2 (2013)A39-A41.
[11] T. Matsuda, Y. Moritomo, Thin film electrode of Prussian blue analogue for Li-ion battery, Applied Physics Express, 4 (2011)047101.
[12] J. Qian, M. Zhou, Y. Cao, X. Ai, H. Yang, Nanosized $Na_4Fe(CN)_6$/C composite as a low-cost and high-rate cathode material for sodium-ion batteries, Advanced Energy Materials, 2 (2012)410-414.

It would be advantageous if a TMHCF cathode could be treated or modified in such a manner as to support the lattice structure through multiple cycles of charge and discharge.

SUMMARY OF THE INVENTION

Disclosed herein is the use of ferrocyanides or ferricyanides as additives in rechargeable batteries with a transition metal hexacyanoferrate (TMHCF) electrode, which improves the performance of the electrode in a non-aqueous electrolyte. Ferrocyanides or ferricyanides, $A_xFe(CN)_6$ (x=3 or 4), dissociate to $A^+$ and $Fe(CN)_6^{3-}$ or $Fe(CN)_6^{4-}$ ions. These ions can push Equation 2 backwards, which prevents TMHCF from dissolution in the non-aqueous electrolyte:

$$A_xM_yFe_z(CN)_n \cdot mH_2O = xA^{a+} + yM^{b+} + [Fe_z(CN)_{n'}]^{c-} + mH_2O. \quad (2)$$

TMHCF can be represented as $A_xM_yFe_z(CN)_n \cdot mH_2O$, with A being selected from alkali or alkaline metals, and where M can be one or several transition metals. As an additive, ferrocyanides or ferricyanides improves the capacity of the TMHCF and its capacity retention.

Accordingly, a TMHCF battery electrode is provided with a $Fe(CN)_6$ additive. The electrode is made from $A_xM_yFe_z(CN)_n \cdot mH_2O$ particles overlying a current collector, where the A cations are either alkali and alkaline-earth cations such as sodium (Na), potassium (K), calcium (Ca), or magnesium (Mg), and where:

M is a transition metal;
x is in the range of 0 to 2;
y is in the range of 0 to 2;
z is in the range of 0.1 to 2;
n is in the range of 1 to 6; and,
m is in the range of 0 to 7.

A $Fe(CN)_6$ additive modifies the $A_xM_yFe_z(CN)_n \cdot mH_2O$ particles. The $Fe(CN)_6$ additive may be ferrocyanide ($[Fe(CN)_6]^{4-}$) or ferricyanide ($[Fe(CN)_6]^{3-}$).

In a TMHCF battery, the above described electrode may be a cathode. In that case, the battery is also made up of an electrolyte and an anode, which may include an A' metal, an A' metal containing composite, or a material that can host A' atoms. The A' cations are either alkali or alkaline-earth cations, and A is not necessarily the same material as A'. The electrolyte may be an organic solvent containing A-atom salts, A'-atom salts, or a combination of the above-mentioned salts. The $Fe(CN)_6$ may be added to the cathode, the anode, or electrolyte, or in a combination of the above-mentioned components.

Also provided is a method for synthesizing a TMHCF battery electrode with a $Fe(CN)_6$ additive. The method synthesizes a $A_xM_yFe_z(CN)_n \cdot mH_2O$ powder, and mixes the $A_xM_yFe_z(CN)_n \cdot mH_2O$ powder with a conducting carbon and an organic binder in an organic solution, creating a mixture. $Fe(CN)_6$ is added to the mixture, forming a modified mixture. Finally, the modified mixture with $Fe(CN)_6$ is formed on a metal current collector, creating an electrode.

Additional details of the above-described TMHCF electrode, TMHCF battery, TMHCF electrode fabrication process, and a TMHCF battery fabrication process are presented below.

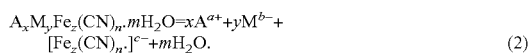

Figure 5A:
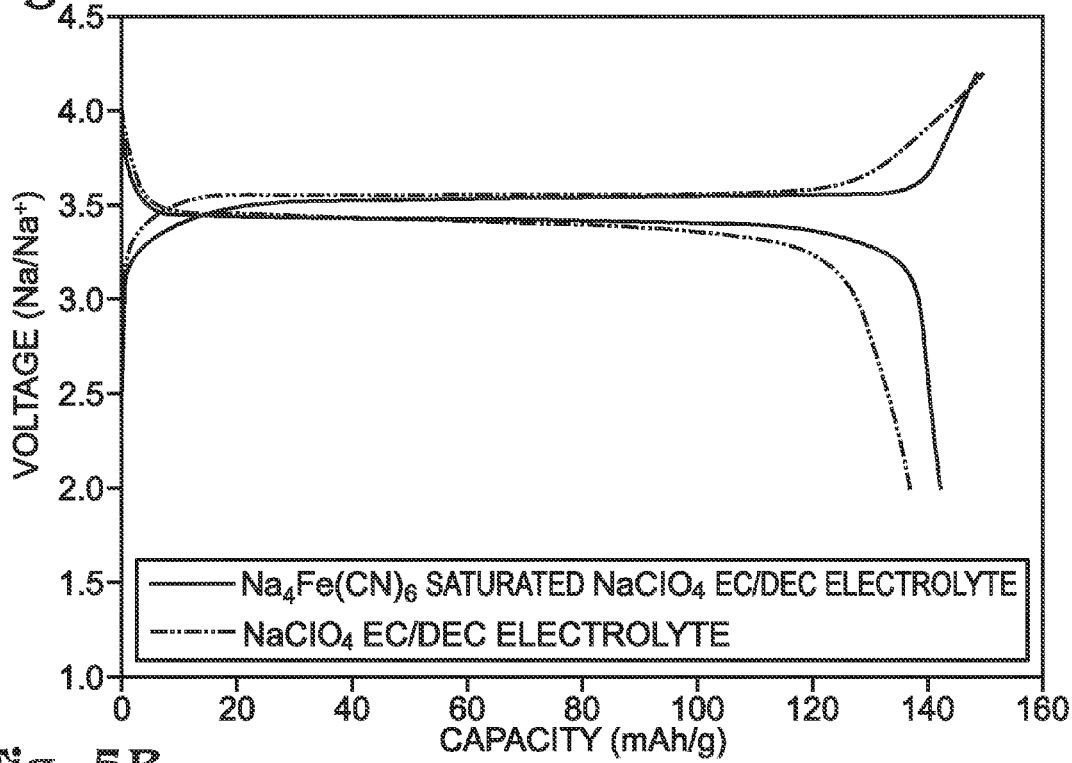
Figure 5B:
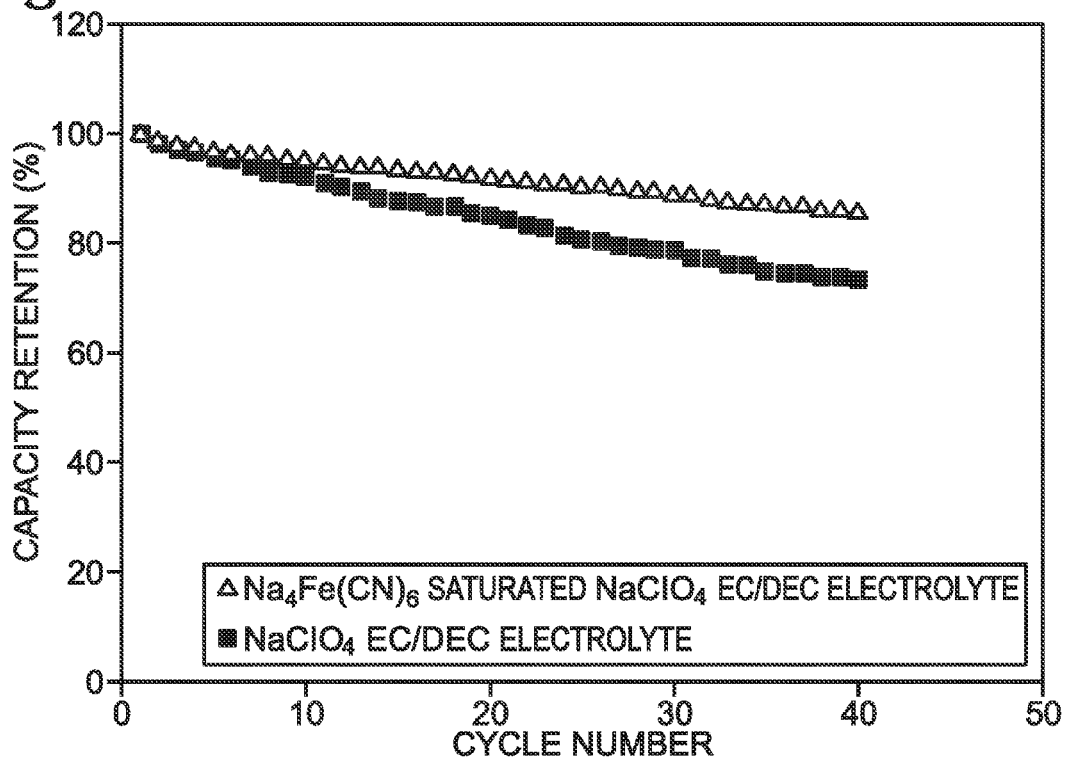

FIGS. 5A and 5B depict the performance of Mn—HCF in a saturated $NaClO_4$ ethylene carbonate (EC)/diethyl carbonate (DEC) electrolyte with and without $Na_4Fe(CN)_6$.

Figure 6:
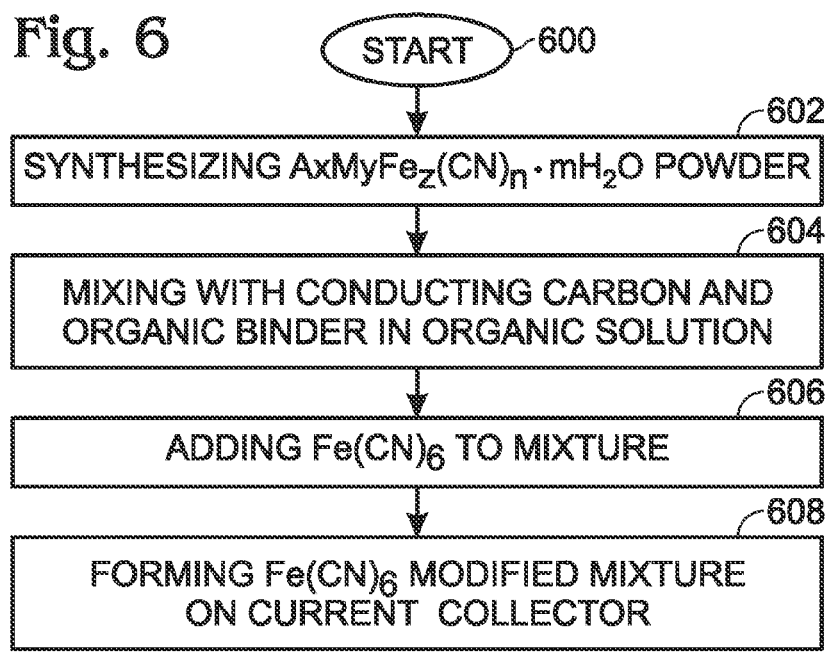

FIG. 6 is a flowchart illustrating a method for synthesizing a TMHCF battery electrode with a $Fe(CN)_6$ additive.

Figure 7:
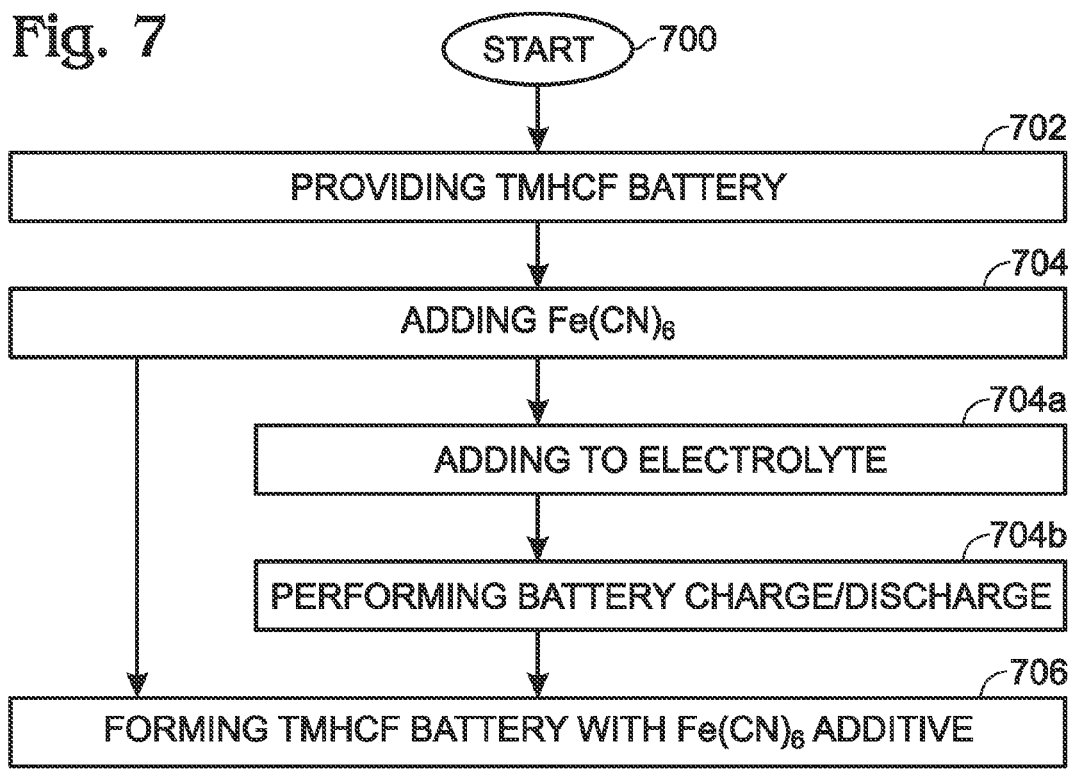

FIG. 7 is a flowchart illustrating a method for fabricating a TMHCF battery with a $Fe(CN)_6$ additive.

DETAILED DESCRIPTION

Figure 1:
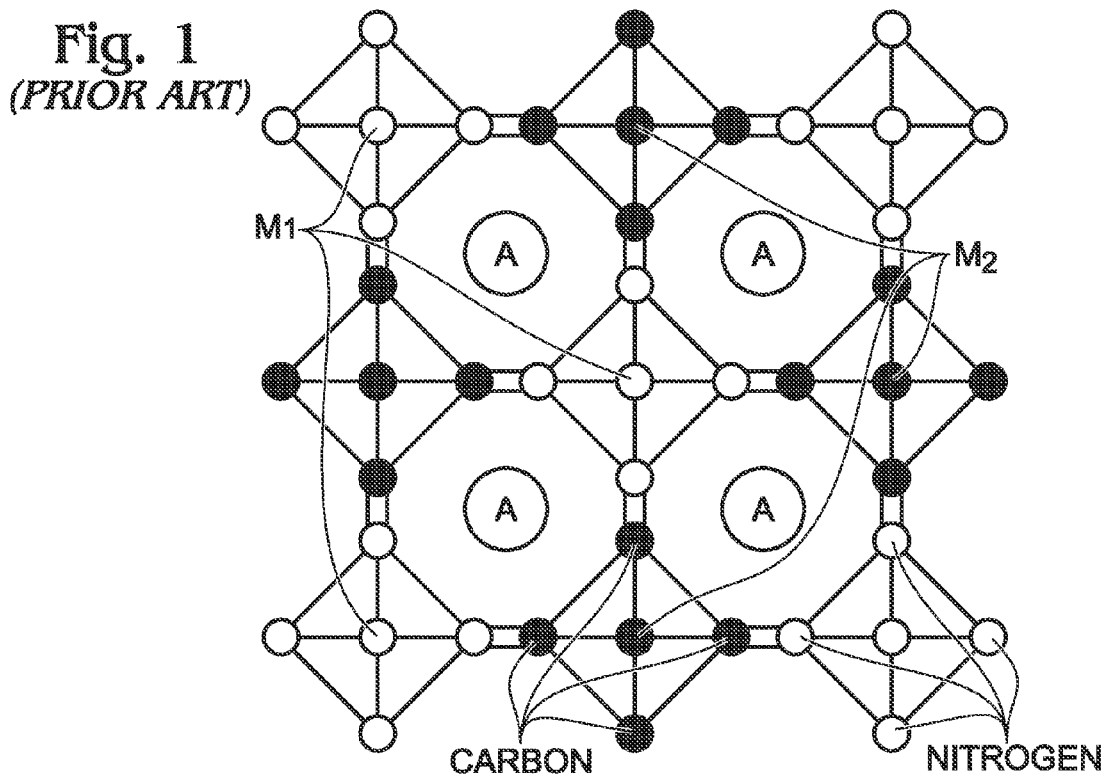
FIG. 1 is a diagram depicting the crystal structure of a transition metal hexacyanoferrate (TMHCF) in the form of $A_xM1M2(CN)_6$ (prior art).
Figure 2A:
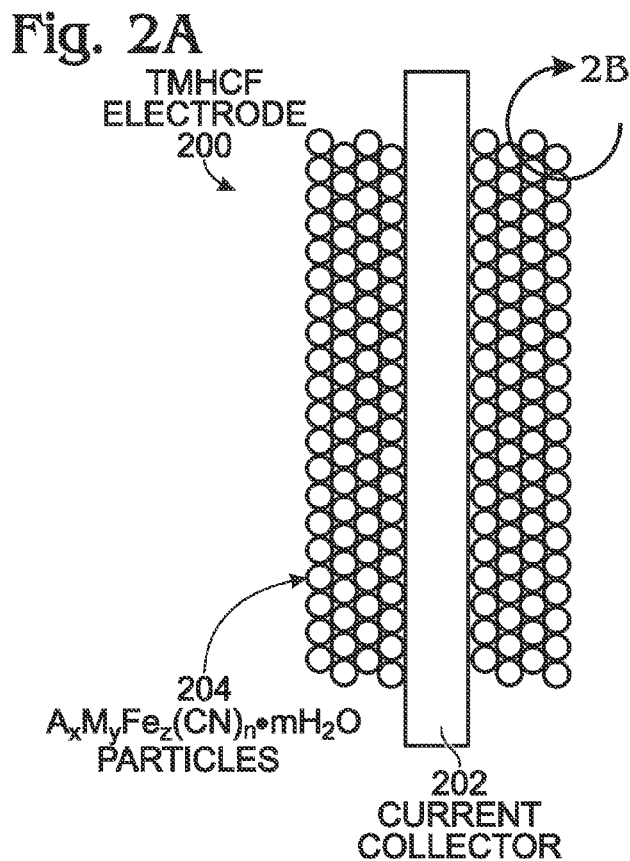
FIGS. 2A and 2B are, respectively, a partial cross-sectional view of a transition metal hexacyanoferrate (TMHCF) battery electrode with a $Fe(CN)_6$ additive, and a $A_xM_yFe_z(CN)_n \cdot mH_2O$ particle in detail.
Figure 2B:
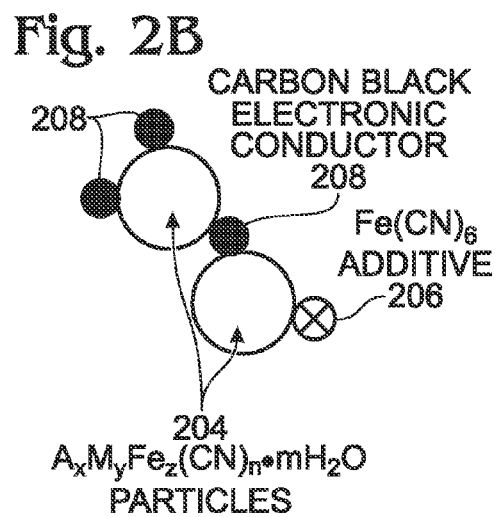

FIGS. 2A and 2B are, respectively, a partial cross-sectional view of a transition metal hexacyanoferrate (TMHCF) battery electrode with a $Fe(CN)_6$ additive, and a $A_xM_yFe_z(CN)_n \cdot mH_2O$ particle in detail. The electrode 200 comprises a metal current collector 202. $A_xM_yFe_z(CN)_n \cdot mH_2O$ particles 204 overlie the current collector 202. The A cations are either alkali or alkaline-earth cations, such as sodium (Na), potassium (K), calcium (Ca), or magnesium (Mg), where:
M is a transition metal;
x is in the range of 0 to 2;
y is in the range of 0 to 2;
z is in the range of 0.1 to 2;
n is in the range of 1 to 6; and,
m is in the range of 0 to 7.

A Fe(CN)$_6$ additive 206 modifies the A$_x$M$_y$Fe$_z$(CN)$_n$·mH$_2$O particles. In some aspects, the electrode 200 further comprises carbon black conductor particles 208. The Fe(CN)$_6$ additive 206 is either ferrocyanide ([Fe(CN)$_6$]$^{4-}$) or ferricyanide ([Fe(CN)$_6$]$^{3-}$).

Figure 3:
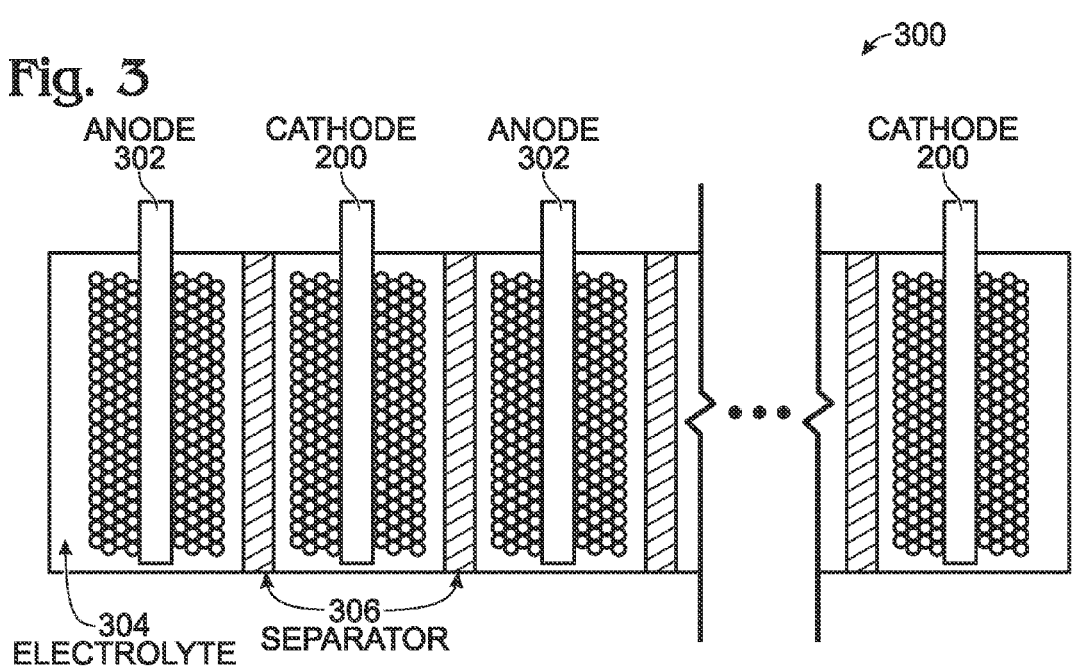
FIG. 3 is a partial cross-sectional view of a TMHCF battery with a $Fe(CN)_6$ additive.

FIG. 3 is a partial cross-sectional view of a TMHCF battery with a Fe(CN)$_6$ additive. The battery 300 comprises a cathode. In this case, the battery cathode is the same as the TMHCF electrode described above in the explanation of FIGS. 2A and 2B. As shown in FIGS. 2A and 2B, the electrode 200 (in FIG. 3 a cathode) comprises a metal current collector 202 and A$_x$M$_y$Fe$_z$(CN)$_n$·mH$_2$O particles 204 overlying the current collector 202. The A cations are either alkali or alkaline-earth cations, such as Na, K, Ca, or Mg, where:
M is a transition metal;
x is in the range of 0 to 2;
y is in the range of 0 to 2;
z is in the range of 0.1 to 2;
n is in the range of 1 to 6; and,
m is in the range of 0 to 7.

Returning to FIG. 3, the battery 300 further comprises an anode 302 including an A' metal, an A' metal containing composite, or a material that can host A' atoms. Again, A' cations are either alkali or alkaline-earth cations, such as Na, K, Ca, or Mg. However, A' need not necessarily be the same element as A. The battery 300 also comprises an electrolyte 302 that may include A-atom salts, A'-atom salts, or a combination of the above-mentioned salts. The electrolyte 304 fills unoccupied regions around each cathode 200 and anode 302, and a separator 306 is formed between each anode 302 and cathode 200.

A Fe(CN)$_6$ additive (see FIG. 2B, 206) modifies the A$_x$M$_y$Fe$_z$(CN)$_n$·mH$_2$O particles 204 in the cathode 200. The Fe(CN)$_6$ may be added to the cathode 200, the anode 302, electrolyte 304, or combinations of the above-mentioned components. The Fe(CN)$_6$ additive 206 may be either ferrocyanide ([Fe(CN)$_6$]$^{4-}$) or ferricyanide ([Fe(CN)$_6$]$^{3-}$).

FIG. 3 depicts one style of battery comprised of a number of cells as an example. However, the TMHCF battery with Fe(CN)$_6$ additive is not limited to any particular style of design of battery.

As described herein, ferrocyanides or ferricyanides are used as additives in rechargeable batteries with a TMHCF electrode to improve their performance. TMHCF has the general formula of A$_x$M$_y$Fe$_z$(CN)$_n$·mH$_2$O, in which A is alkali-ion or alkaline-ion that can freely move in the structures of TMHCF. When TMHCF is used in rechargeable batteries, the following reaction occurs during the charging process:

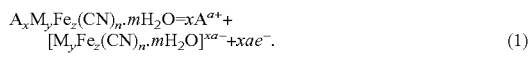
(1)

M$_y$Fe$_z$(CN)$_n$·mH$_2$O constitutes the TMHCF framework into/from which A-ions can be easily inserted/extracted. The stability of the framework determines the TMHCF cycling life.

It is inevitable that the solid state compounds dissolve into solutions. TMHCF is unexceptional in this regard. There is a dynamic equilibrium for TMHCF in solution, as follows:

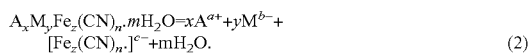
(2)

Therefore, in a battery with TMHCF electrodes, TMHCF can also dissolve into the electrolyte. As this happens, the structure of TMHCF electrode starts to collapse from the surface, which shortens the cycling lives of the batteries.

However, ferrocyanides or ferricyanides can be used as additives in rechargeable batteries with TMHCF electrodes to address this problem. In the electrolyte, ferrocyanides or ferricyanides, A'$_x$Fe(CN)$_6$ (x=3 or 4), dissociate to A'$^+$ and Fe(CN)$_6$$^{3-}$/Fe(CN)$_6$$^{4-}$. Here, A' can be the same as or different from A in TMHCF. Dissociation of ferrocyanides/ferricyanides maintains a high concentration of Fe(CN)$_6$$^{3-}$/Fe(CN)$_6$$^{4-}$ that pushes Equation 2 backward to stabilize the TMHCF structures. In addition, Fe(CN)$_6$$^{3-}$ or Fe(CN)$_6$$^{4-}$ ions can re-constitute the surface of TMHCF electrodes. As soon as M-ions exit from the surface of the TMHCF electrode, as shown in Equation 2, they react with Fe(CN)$_6$$^{3-}$ or Fe(CN)$_6$$^{4-}$ ions to reconstitute the [M$_y$Fe$_z$(CN)$_n$·mH$_2$O framework again. Therefore, the performance of TMHCF electrodes is improved.

Ferrocyanides or ferricyanides can be added using two different approaches. One approach is to directly mix ferrocyanides or ferricyanides with TMHCF electrode during fabrication, and the other approach is to dissolve ferrocyanides/ferricyanides into the electrolyte. As for the first approach, the TMHCF electrodes are made of TMHCF, binder, electronic conductor, and ferrocyanides/ferricyanides. The content of the ferrocyanides/ferricyanides can be from 0 to 50 wt. %. As for the second approach, ferrocyanides or ferricyanides can be directly dissolved into electrolyte. The concentration of ferrocyanides/ferricyanides can be from 0 to a saturated concentration.

Figure 4A:
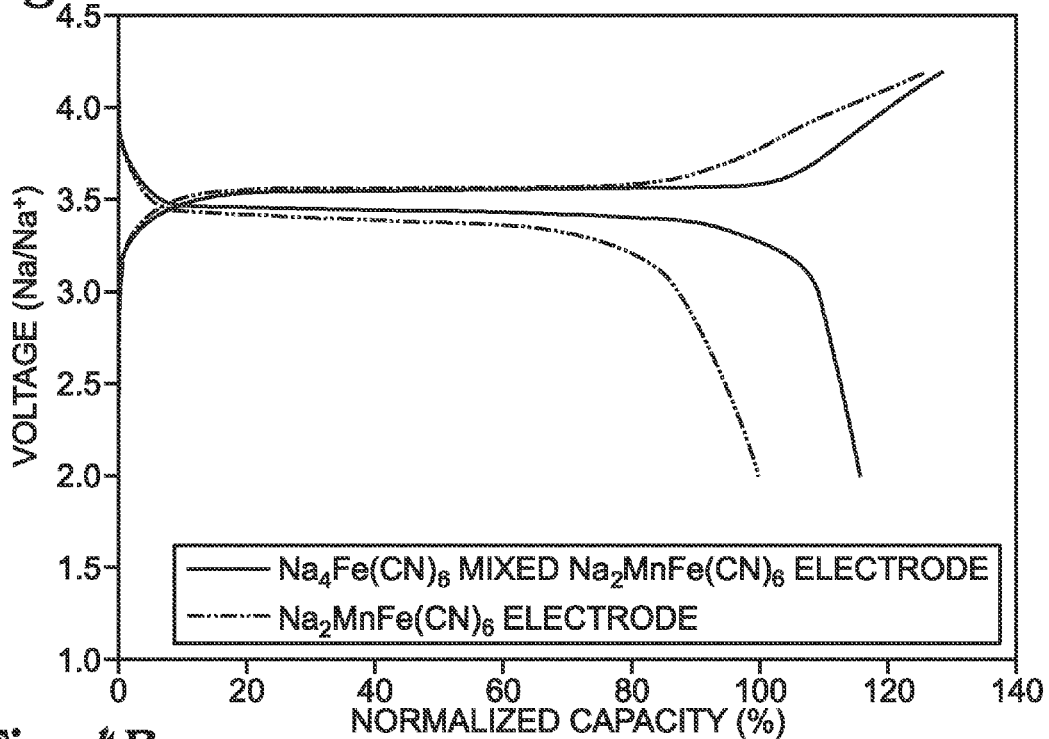
FIGS. 4A and 4B are graphs depicting the charge/discharge profiles of Mn—HCF and $Na_4Fe(CN)_6$ mixed Mn—HCF electrodes.
Figure 4B:
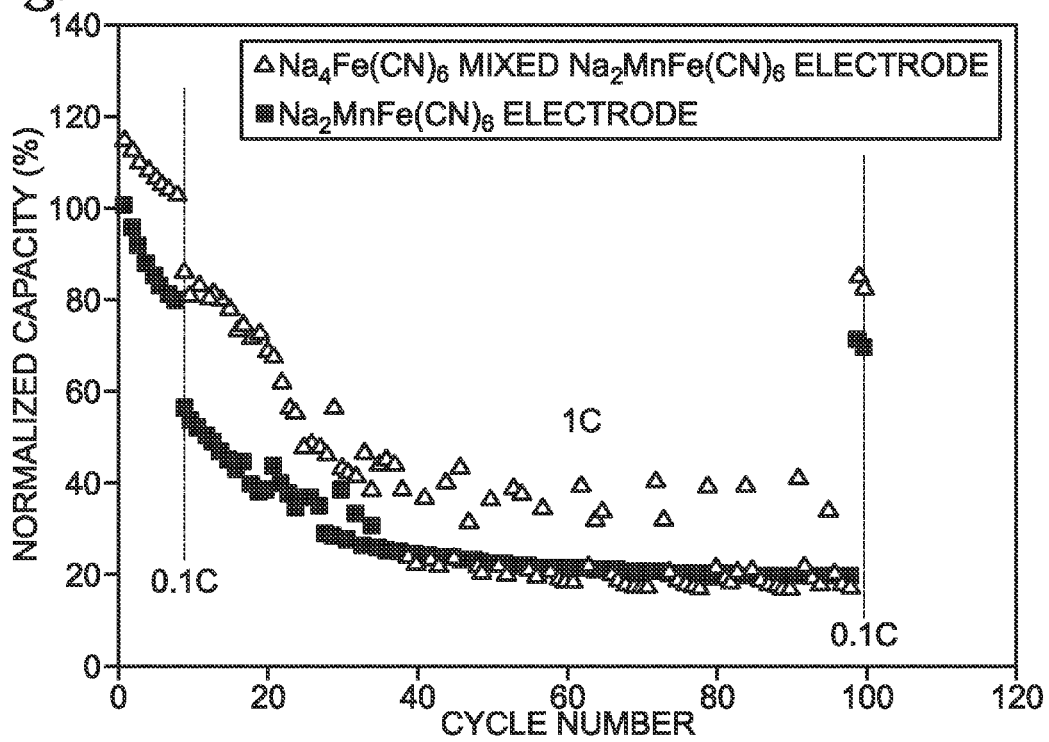

FIGS. 4A and 4B are graphs depicting the charge/discharge profiles of Mn—HCF and Na$_4$Fe(CN)$_6$ mixed Mn—HCF electrodes. As an example, manganese HCF, Na$_2$MnFe(CN)$_6$, was used as a cathode material in a rechargeable sodium-ion batteries. Sodium ferrocyanide, Na$_4$Fe(CN)$_6$, was added to the batteries as a modifier. Using the first approach mentioned above, 3 wt. % sodium ferrocyanide was mixed into the Mn—HCF electrode. In order to compare these two kinds of electrodes, all capacities were normalized based on the maximum discharge capacity of the Mn—HCF electrode.

As shown in FIG. 4A, the addition of 3 wt. % Na$_4$Fe(CN)$_6$ improved the capacity of the Mn—HCF electrode. The capacity of the Na$_4$Fe(CN)$_6$ mixed Mn—HCF electrode was about 20% higher than that of the Mn—HCF electrode. Although Na$_4$Fe(CN)$_6$ was active for sodium-ion intercalation [12], the incremental capacity was much higher than the contribution of Na$_4$Fe(CN)$_6$. There might be two reasons for the improvement of Mn—HCF electrode. One reason might be that the addition of Na$_4$Fe(CN)$_6$ interacted with water inside Mn—HCF, permitting more sodium-ion to enter the MN—HCF interstitial space. The other reason might be that the dissociation of Na$_4$Fe(CN)$_6$ provided a relatively high Na-ion concentration for sodium-ion intercalation. Na$_4$Fe(CN)$_6$ also improved the capacity retention of Mn—HCF electrode. In 100 cycles, the capacity retention of Na$_4$Fe(CN)$_6$-mixed Mn—HCF electrode was at least 5% larger than that of Mn—HCF electrode as shown in FIG. 4B. The mechanism for the capacity retention improvement has been discussed above.

FIGS. 5A and 5B depict the performance of Mn—HCF in a saturated NaClO$_4$ ethylene carbonate (EC)/diethyl carbonate (DEC) electrolyte with and without Na$_4$Fe(CN)$_6$. In the electrolyte, Na$_4$Fe(CN)$_6$ dissociated to sodium-ions and Fe(CN)$_6$$^{4-}$. In order to make these ions accessible to all surfaces of Mn—HCF electrode easily, Na$_4$Fe(CN)$_6$ was dissolved into the electrolyte. Na-ions and $Fe(CN)_6^{4-}$ ions moved to any Mn—HCF particles along the porous structure of Mn—HCF electrode. The additive of $Na_4Fe(CN)_6$ improved the Mn—HCF capacity slightly, as shown in FIG. 5A. However, the $Na_4Fe(CN)_6$ additive increased the capacity of the Mn—HCF electrode by 15% in 40 cycles with a charge/discharge current of 0.1 C as shown in FIG. 5B.

FIG. 6 is a flowchart illustrating a method for synthesizing a TMHCF battery electrode with a $Fe(CN)_6$ additive. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 synthesizes a $A_xM_yFe_z(CN)_n \cdot mH_2O$ powder. The A cations are either alkali or alkaline-earth cations such as Na, K, Ca, or Mg, and where:
  M is a transition metal;
  x is in the range of 0 to 2;
  y is in the range of 0 to 2;
  z is in the range of 0.1 to 2;
  n is in the range of 1 to 6; and,
  m is in the range of 0 to 7.

Step 604 mixes the $A_xM_yFe_z(CN)_n \cdot mH_2O$ powder with a conducting carbon and an organic binder in an organic solution, creating a mixture. Step 606 adds $Fe(CN)_6$ to the mixture, forming a modified mixture. Typically, Steps 604 and 606 are preformed simultaneously. The $Fe(CN)_6$ may be ferrocyanide ($[Fe(CN)_6]^{4-}$) or ferricyanide ($[Fe(CN)_6]^{3-}$). Step 608 forms the modified mixture with $Fe(CN)_6$ on a metal current collector, creating an electrode. For example, the modified mixture may be applied as a paste, and then dried.

FIG. 7 is a flowchart illustrating a method for fabricating a TMHCF battery with a $Fe(CN)_6$ additive. The method begins at Step 700. Step 702 provides a battery, as described above in the explanation of FIG. 3. In summary the battery has a cathode with $A_xM_yFe_z(CN)_n \cdot mH_2O$ particles overlying a current collector, and an anode including an A' metal, an A' metal containing composite, or a material that can host A' atoms. The above-mentioned anode material may be mixed with a conducting carbon and formed on a metal current collector. Further, the battery comprises an electrolyte. Step 704 adds a $Fe(CN)_6$ additive such as ferrocyanide or ferricyanide. The $Fe(CN)_6$ can be added to the cathode, as described above in the explanation of FIG. 6, or the anode. In one aspect, Step 704a adds $Fe(CN)_6$ to the electrode, and Step 704b performs at least one cycle of battery charge and battery discharge. Step 706 forms a TMHCF battery with $Fe(CN)_6$ additive.

As with the battery of FIG. 3, The A cations are either alkali or alkaline-earth cations, such as Na, K, Ca, or Mg, where:
  M is a transition metal;
  x is in the range of 0 to 2;
  y is in the range of 0 to 2;
  z is in the range of 0.1 to 2;
  n is in the range of 1 to 6; and,
  m is in the range of 0 to 7.

Again, the A' cations are either alkali or alkaline-earth cations, such as Na, K, Ca, or Mg. However, A' need not necessarily be the same element as A. The electrolyte may include A-atom salts, A'-atom salts, or a combination of the above-mentioned salts.

A TMHCF electrode with $Fe(CN)_6$ additive, along with an associated battery, fabrication process, and charge cycling process have been provided. Examples of particular materials and process steps have been presented to illustrate the invention. However, the invention is not limited to merely these examples. Other variations and embodiments of the invention will occur to those skilled in the art.

We claim:

1. A transition metal hexacyanoferrate (TMHCF) battery electrode with a $Fe(CN)_6$ additive, the electrode comprising:
  a metal current collector;
  $A_xM_yFe_z(CN)_n \cdot mH_2O$ particles overlying the current collector;
    where A cations are selected from a group consisting of alkali and alkaline-earth cations;
    where M is a transition metal;
    where x is in a range of 0 to 2;
    where y is in a range of 0 to 2;
    where z is in a range of 0.1 to 2;
    where n is in a range of 1 to 6;
    where m is in a range of 0 to 7; and,
  a $Fe(CN)_6$ additive modifying the $A_xM_yFe_z(CN)_n \cdot mH_2O$ particles.

2. The TMHCF battery electrode of claim 1 wherein the $Fe(CN)_6$ additive is selected from a group consisting of ferrocyanide ($[Fe(CN)_6]^{4-}$) and ferricyanide ($[Fe(CN)_6]^{3-}$).

3. The TMHCF battery electrode of claim 1 wherein the A cations are selected from a group consisting of sodium (Na), potassium (K), calcium (Ca), and magnesium (Mg).

4. A transition metal hexacyanoferrate (TMHCF) battery with a $Fe(CN)_6$ additive, the battery comprising:
  a cathode comprising:
    a metal current collector;
    $A_xM_yFe_z(CN)_n \cdot mH_2O$ particles overlying the current collector;
      where A cations are selected from a group consisting of alkali and alkaline-earth cations;
      where M is a transition metal;
      where x is in a range of 0 to 2;
      where y is in a range of 0 to 2;
      where z is in a range of 0.1 to 2;
      where n is in a range of 1 to 6;
      where m is in a range of 0 to 7;
  an anode selected from a group consisting of an A' metal, an A' metal containing composite, and a material that can host A' atoms, where A' cations are selected from a group consisting of alkali and alkaline-earth cations;
  an electrolyte; and,
  a $Fe(CN)_6$ additive modifying the $A_xM_yFe_z(CN)_n \cdot mH_2O$ particles in the cathode.

5. The TMHCF battery of claim 4 wherein the $Fe(CN)_6$ additive is selected from a group consisting of ferrocyanide ($[Fe(CN)_6]^{4-}$) and ferricyanide ($[Fe(CN)_6]^{3-}$).

6. The TMHCF battery of claim 4 wherein the electrolyte is an organic solvent containing an ingredient selected from a group consisting of A-atom salts, A'-atom salts, and a combination of the above-mentioned salts.

7. The TMHCF battery of claim 4 wherein A is selected from a group consisting of sodium (Na), potassium (K), calcium (Ca), and magnesium (Mg); and,
  wherein A' is selected from a group consisting of Na, K, Ca, and Mg.

8. The TMHCF battery of claim 4 wherein the $Fe(CN)_6$ is added to a battery component selected from a group consisting of the cathode, the anode, and electrolyte, and combinations of the above-mentioned components.

9. A method for synthesizing a transition metal hexacyanoferrate (TMHCF) battery electrode with a $Fe(CN)_6$ additive, the method comprising:
  synthesizing a $A_xM_yFe_z(CN)_n \cdot mH_2O$ powder;
    where A cations are selected from a group consisting of alkali and alkaline-earth cations;

where M is a transition metal;
where x is in a range of 0 to 2;
where y is in a range of 0 to 2;
where z is in a range of 0.1 to 2;
where n is in a range of 1 to 6;
where m is in a range of 0 to 7;
mixing the $A_xM_yFe_z(CN)_n \cdot mH_2O$ powder with a conducting carbon and an organic binder in an organic solution, creating a mixture;
adding $Fe(CN)_6$ to the mixture, forming a modified mixture; and,
forming the modified mixture with $Fe(CN)_6$ on a metal current collector, creating an electrode.

10. The method of claim 9 wherein synthesizing the $A_xM_yFe_z(CN)_n \cdot mH_2O$ powder includes A being selected from a group consisting of sodium (Na), potassium (K), calcium (Ca), and magnesium (Mg).

11. The method of claim 9 wherein adding the $Fe(CN)_6$ includes adding a material selected from a group consisting of ferrocyanide ($[Fe(CN)_6]^{4-}$) and ferricyanide ($[Fe(CN)_6]^{3-}$).

12. A method for fabricating a transition metal hexacyanoferrate (TMHCF) battery with a $Fe(CN)_6$ additive, the method comprising:
providing a battery comprising:
a cathode with $A_xM_yFe_z(CN)_n \cdot mH_2O$ particles overlying a current collector;
an anode selected from a group consisting of an A' metal, an A' metal containing composite, and a material that can host A' atoms;
an electrolyte;
adding a $Fe(CN)_6$ additive to a component selected from a group consisting of the cathode, the anode, and the electrolyte; and,
forming a TMHCF battery with $Fe(CN)_6$ additive.

13. The method of claim 12 wherein the $Fe(CN)_6$ additive is selected from a group consisting of ferrocyanide ($[Fe(CN)_6]^{4-}$) and ferricyanide ($[Fe(CN)_6]^{3-}$).

14. The method of claim 12 wherein providing the battery includes:
A cations being selected from a group consisting of alkali and alkaline-earth cations;
M being a transition metal;
x being in a range of 0 to 2;
y being in a range of 0 to 2;
z being in a range of 0.1 to 2;
n being in a range of 1 to 6;
m being in a range of 0 to 7; and,
A' cations being selected from the group consisting of alkali and alkaline-earth cations.

15. The method of claim 14 wherein providing the battery includes A being selected from a group consisting of sodium (Na), potassium (K), calcium (Ca), and magnesium (Mg); and,
wherein A' is selected from a group consisting of Na, K, Ca, and Mg.

16. The method of claim 12 wherein providing the battery includes the electrolyte being an organic solvent containing an ingredient selected from a group consisting of A-atom salts, A'-atom salts, and a combination of the above-mentioned salts.

17. The method of claim 12 wherein adding the $Fe(CN)_6$ additive includes:
adding $Fe(CN)_6$ to the electrolyte; and,
performing a charge/discharge cycle.

* * * * *